United States Patent
Womack

[15] 3,704,067
[45] Nov. 28, 1972

[54] VIEW AND CUTTER APPARATUS

[72] Inventor: William Randol Womack, 2400 Mainway Building, Clovis, N. Mex. 88101

[22] Filed: Nov. 17, 1970

[21] Appl. No.: 90,319

[52] U.S. Cl. .................355/29, 40/86, 40/106.1, 83/520, 353/21, 355/113
[51] Int. Cl. .................................................G03b 29/00
[58] Field of Search .............83/520; 355/28, 29, 113; 353/21; 356/199, 200, 237, 239; 352/123, 129, 130; 40/86, 106.1

[56] References Cited

UNITED STATES PATENTS

| | | |
|---|---|---|
| 2,495,957 | 1/1950 | Corsaw..................352/130 X |
| 2,591,519 | 4/1952 | Decker..................352/129 X |
| 2,674,933 | 4/1954 | Wigglesworth............355/113 |
| 2,855,834 | 10/1958 | Doster....................355/29 |
| 2,213,313 | 9/1940 | Hill.....................355/29 X |
| 2,380,267 | 7/1945 | Ruth.....................355/29 X |
| 2,906,167 | 9/1959 | Castedello et al. ....352/129 X |
| 3,282,150 | 11/1966 | Burton....................355/28 |

Primary Examiner—Samuel S. Matthews
Assistant Examiner—Richard A. Wintercorn
Attorney—Watson, Cole, Grindle & Watson

[57] ABSTRACT

Apparatus is provided for accurately cutting Panorex radiographs on a mounting frame which may be illuminated to aid in the cutting. The apparatus also includes a removable mounting frame so that the Panorex film may be duplicated. A timer is provided to control the illumination for exposure of the duplicating film. The combined apparatus affords an improved means for accurately cutting the film so that the two halves may be reassembled in accurate relationship to view right and left teeth exposures and also for accurately exposing the film to provide duplicate copies of the same.

2 Claims, 4 Drawing Figures

PATENTED NOV 28 1972 3,704,067

INVENTOR,
WILLIAM RANDOL WOMACK

BY
Watson, Cole, Grindle & Watson
ATTORNEYS

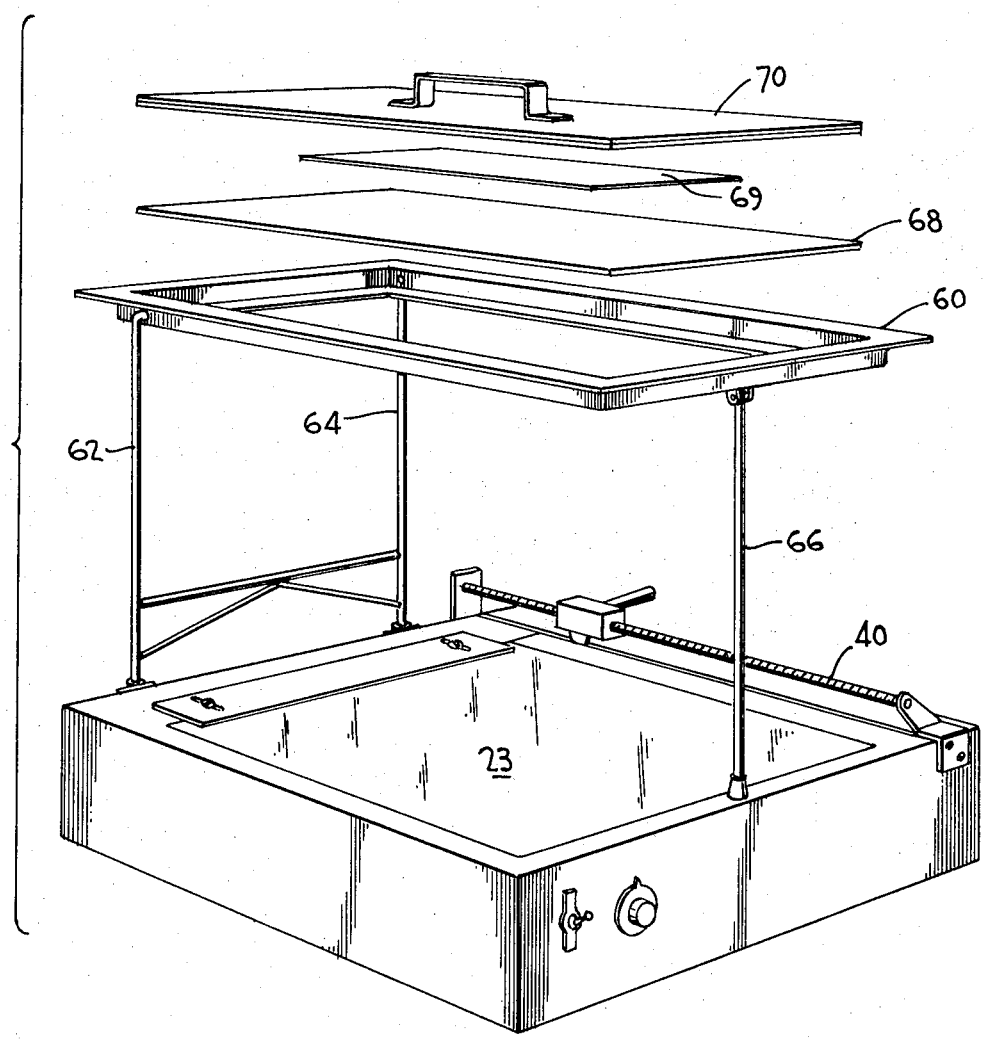
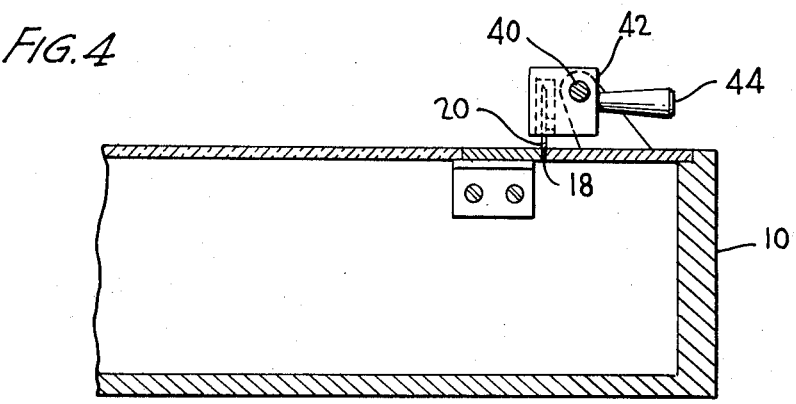

VIEW AND CUTTER APPARATUS

This invention relates to combined apparatus for viewing, cutting and duplicating film exposures and, more particularly, to such apparatus for viewing, cutting and duplicating Panorex radiographs which are used by dentists in examining the condition of teeth.

Known apparatus is available for cutting the right and left halves of the Panorex film; however, such apparatus does not provide sufficient accuracy in the squareness and position of the cut. In using Panorex film, it is necessary to accurately sever the right and left exposures corresponding to the right and left teeth, and then to reassemble the film for proper viewing and analysis of the condition of the teeth.

There is also a need to have a consistently reliable and easily used means for duplicating desired radiographs.

The combined apparatus of this invention provides an improved apparatus for viewing, cutting and duplicating Panorex radiographs in a manner which is significantly improved over known prior art apparatus. A light source is mounted within a suitable housing and includes squaring guides and a wheel-type cutter mounted on an upper surface above the light source and a transparent covering which is mounted between the light source and the cutting wheel. The film is placed on top of the covering and aligned accurately in the desired position by means of the squaring guides and then cut by drawing the wheel cutter across the film. A flat, felt-covered plate may also be provided in order to keep the film in the desired position as the cutting operation is performed.

A removable duplicating frame is provided which is mounted to the housing enclosing the light source and the cutter apparatus so that a desired Panorex film and a duplication film may be mounted within the removable frame to provide a copy of the film. Timer apparatus is provided to control the illumination for proper exposure of the duplicating film. The removable frame includes mounting members which ensure that the film is always exposed at a constant distance from the light source. A removable cover plate is provided to maintain the exposed Panorex film and duplicating film in a flat relationship to avoid wrinkling and to obtain a good exposure. The timing means also affords a means to obtain various settings for light or dark exposures.

It is a primary object of this invention to provide improved apparatus for accurately locating and cutting Panorex film.

It is also a further primary object of this invention to provide apparatus for exposing and duplicating Panorex film to obtain consistent quality duplicated films.

The various advantages and features of the invention will be more clearly understood with reference to the following disclosure taken in conjunction with the drawings wherein:

FIG. 3 illustrates the removable exposure and duplicating frame attached to the main frame; and FIG. 4 illustrates a cross-sectional view of the cutter apparatus through line 4—4 of FIG. 2.

Figure 1:
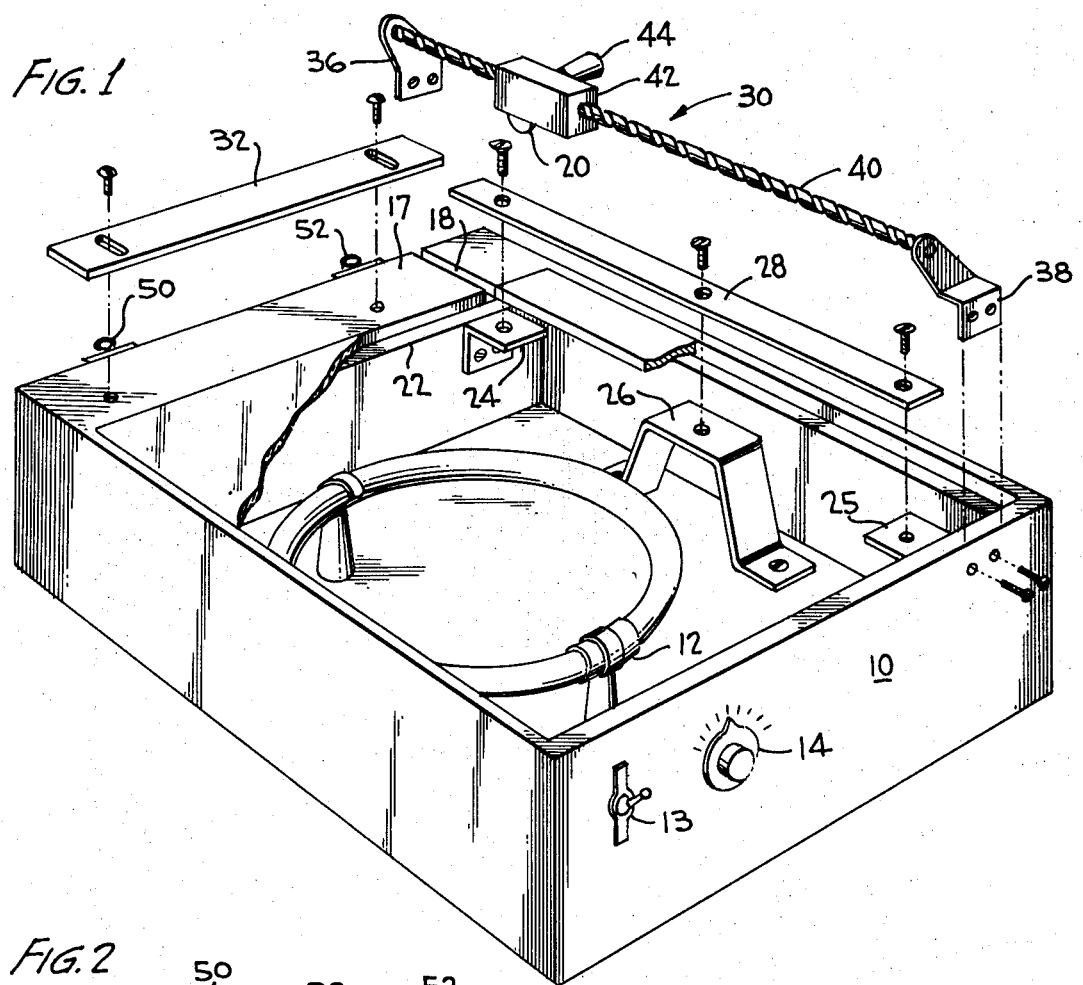
FIG. 1 illustrates an exploded view of the main mounting frame of the cutter apparatus.

As illustrated in FIG. 1, main housing frame 10 consists of a rectangularly shaped box which may be constructed from a suitably stamped metal or cast plastic material. Light fixture 12 is mounted to the bottom surface of the housing and is connected to suitable on/off switch 13 and timer control 14 by means of wires 16. Lip 17 of the housing includes slot 18 through which cutting wheel 20 protrudes when the cutting wheel is at its starting position. Lip 17 includes a flange strip portion 22 which extends around the rectangular opening in the top of housing 10 to provide a support for transparent covering 23 (FIG. 3). Support arms 24, 25 and support stand 26 afford a means for mounting cutting bar 28 and cutter assembly 30 to the housing. Squaring guide 32 fits over the transparent covering and is partially supported by flange 22 and support arm 24.

Cutter assembly 30 is mounted to the housing by means of support arms 24, 25, support stand 26, and brackets 36 and 38 which are respectively mounted to each end of the cutter assembly. The cutter assembly consists primarily of a threaded bar 40 and slidable assembly 42 which mounts cutter wheel 20 by means of a gear (not shown) engaging the threaded portion of the cutter assembly. Handle 44 is provided so that the cutting wheel may be moved over the threaded portion of the cutting assembly causing cutting wheel 20 to rotate, thereby cutting a piece of film or paper which is placed in the cutter.

Squaring guide 32 and cutting bar 28 afford a means for accurately aligning the film so that a ninety degree cut may be made on the film with respect to the squaring guide 32.

Housing 10 also includes brackets 50 and 52 which are mounted to the housing as illustrated in FIG. 1. A third bracket assembly is also mounted to the upper surface of the housing and is not illustrated in FIG. 1.

Figure 2:
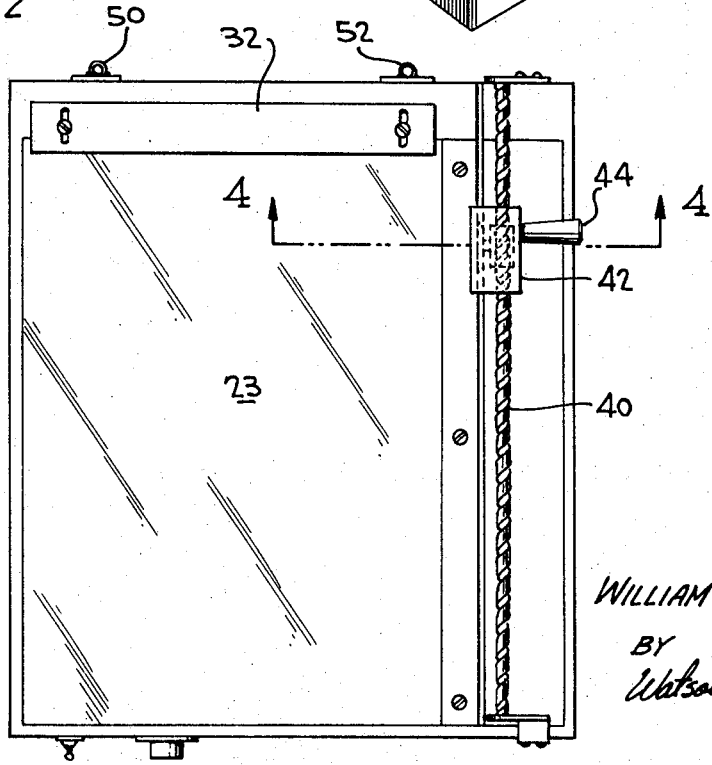
FIG. 2 illustrates a plan view of the main mounting frame.

FIG. 2 illustrates the top view of the mounting frame. This Figure clearly indicates the placement of transparent glass or plastic covering 23 which completely encloses the opening formed in the top of the housing illustrated in FIG. 1 to form a light-proof enclosure except for the light emanating from the covering. A ninety degree cut is made on a piece of film which is placed in abutting relationship with the squaring guide 32 and cutting bar 28 by drawing cutting assembly 42 across the film in a downward direction using handle 44.

FIG. 3 illustrates the mounting of duplicating frame 60 to housing 10 by means of support legs 62, 64 and 66 which respectively engage the aforementioned brackets on the housing. Duplicating frame 60 has a clear glass or plastic bottom 68 which provides a table to support the exposed and duplicating film. As illustrated in FIG. 3, top cover 70 is provided to cover the films to flatten them and cause them to be in close abutting relationship. The frame preferably is mounted at a height of approximately 12 inches above the surface of the opaque covering on the main housing. It is desirable that two differently sized duplicating frames 60 be provided; one having dimensions of 8 ⅛ × 10 ⅛ inches to accommodate the Panorex film which is cut and mounted in a standard green Panorex film mount; and a duplicating frame which has dimensions of 6 ⅛ inches by 10 ⅛ inches in order to accommodate a Panorex film which is cut without the film mount. The green Panorex film mounting is provided to accommodate four periapicals which are used by dentists in analyzing the condition of teeth.

A stabilizing plate 70 similar to that shown in FIG. 3 may also be provided so that the film which is placed on the transparent covering to be severed by the cutting assembly may be firmly held in its desired position during the cutting operation. The dimensions of such a plate may preferably be 6 × 8 inches. A felt pad 69 may be attached to the bottom of the plate to ensure that the film will not be scratched.

The top cover 70, previously described with reference to FIG. 3, may also have a handle on its top surface to aid in its placement and removal from the duplicating frame and also preferably includes a felt pad on its under surface. Its dimensions may be such that it is accommodated in an easy manner within the recesses formed in duplicating frame 60.

A Panorex film is duplicated by placing it within duplicating frame 60, placing the duplicating film in abutting relationship with it, and then holding the two in a firm abutting relationship by top cover 70.

The light 12 is activated by on/off switch 12 and timer 14 provides a means for accurately timing the actuation of the light so that the exposure may be calibrated at various settings to obtain a continuum of light or dark exposures, as desired.

FIG. 4 shows the relationship of cutting wheel 20 to threaded bar 40 and slit 18 in lip 17 of the mounting frame.

What is claimed is:

1. Apparatus for exposing film, comprising:
   a housing having an upper surface including an opening, a transparent member covering said opening and brackets mounted to said housing;
   means mounted within said housing for emitting light;
   a removable film exposing frame including supports engaging with said brackets for mounting said frame at a fixed distance above said transparent member to receive light emanating therefrom, said frame including means for holding a film which is to be exposed and a duplicating film in overlapping non-wrinkled abutting relationship; and
   means for timing said means for emitting light to vary the exposure of film in said frame.

2. Apparatus as in claim 1 wherein said frame is a shallow pan-like member having a transparent bottom, and further comprising means covering said frame and pressing said original and duplicating film in a firm abutting relationship with respect to one another.

* * * * *